United States Patent
Kadoch et al.

(10) Patent No.: US 9,147,116 B2
(45) Date of Patent: Sep. 29, 2015

(54) MULTIPLE RESOLUTION CAMERA SYSTEM FOR AUTOMATED LICENSE PLATE RECOGNITION AND EVENT RECORDING

(71) Applicant: L-3 COMMUNICATIONS MOBILEVISION INC., Boonton, NJ (US)

(72) Inventors: Christopher Allen Kadoch, Leesburg, VA (US); Leo Lorenzetti, Hamburg, NJ (US); Kurt Allen Kessel, Altamonte Springs, FL (US)

(73) Assignee: L-3 COMMUNICATIONS MOBILEVISION, INC., Boonton, NJ (US)

( * ) Notice: Subject to any disclaimer, the term of this patent is extended or adjusted under 35 U.S.C. 154(b) by 391 days.

(21) Appl. No.: 13/645,895

(22) Filed: Oct. 5, 2012

(65) Prior Publication Data

US 2013/0088597 A1 Apr. 11, 2013

Related U.S. Application Data

(60) Provisional application No. 61/543,598, filed on Oct. 5, 2011.

(51) Int. Cl.
*H04N 7/18* (2006.01)
*G06K 9/00* (2006.01)
*G06K 9/20* (2006.01)

(52) U.S. Cl.
CPC ............ *G06K 9/00791* (2013.01); *G06K 9/209* (2013.01)

(58) Field of Classification Search
CPC ............ G06F 2203/0384; G06F 3/038; G06F 3/0383; G06K 9/00791; G06K 9/209; B60R 1/00; B60R 2300/105; B60R 11/04; B60R 2300/802; H04N 7/181

USPC ........................................................ 348/148
See application file for complete search history.

(56) References Cited

U.S. PATENT DOCUMENTS

| 4,405,943 | A | | 9/1983 | Kanaly | |
| 4,673,988 | A | * | 6/1987 | Jansson et al. | ................ 358/453 |

(Continued)

FOREIGN PATENT DOCUMENTS

| EP | 0631683 | 1/1995 |
| WO | WO2009097449 | 8/2009 |

OTHER PUBLICATIONS

Chang et al Automatic License Plate Recognition, 2004.*

(Continued)

*Primary Examiner* — Shan Elahi
(74) *Attorney, Agent, or Firm* — Gardner Groff Greenwald & Villanueva, PC (57) ABSTRACT

An in-car multiple-resolution camera system for first responder vehicles includes a high-resolution camera imager for capturing images in high resolution and outputting the same in a first high-resolution image output stream. A signal processing module is provided for processing the first high-resolution image output stream and producing (1) a reduced-area high-resolution image output stream containing image information for only a selected portion or portions of the original image and (2) a wide-area low-resolution image output stream. The wide-area low-resolution image output stream can represent the full image, if desired. An event recorder is provided for recording the events imaged by the camera imager using the wide-image low-resolution image output stream. A license plate recognition system is provided for using the reduced-area high-resolution image output stream to capture and process images of vehicle license plates nearby.

11 Claims, 5 Drawing Sheets

(56) References Cited

U.S. PATENT DOCUMENTS

| | | | |
|---|---|---|---|
| 6,011,905 A * | 1/2000 | Huttenlocher et al. | 358/1.2 |
| 6,269,175 B1 * | 7/2001 | Hanna et al. | 382/107 |
| 6,323,934 B1 * | 11/2001 | Enomoto | 355/40 |
| 6,404,902 B1 * | 6/2002 | Takano et al. | 382/104 |
| 6,430,304 B2 * | 8/2002 | Hanna et al. | 382/107 |
| 6,490,364 B2 * | 12/2002 | Hanna et al. | 382/107 |
| 6,754,369 B1 * | 6/2004 | Sazawa | 382/105 |
| 7,986,339 B2 * | 7/2011 | Higgins | 348/149 |
| 8,284,996 B2 * | 10/2012 | Winkler | 382/104 |
| 8,750,564 B2 * | 6/2014 | Maeda et al. | 382/103 |
| 2001/0019621 A1 * | 9/2001 | Hanna et al. | 382/107 |
| 2001/0036307 A1 * | 11/2001 | Hanna et al. | 382/154 |
| 2003/0178901 A1 * | 9/2003 | Erten et al. | 310/112 |
| 2003/0190072 A1 * | 10/2003 | Adkins et al. | 382/154 |
| 2004/0218099 A1 * | 11/2004 | Washington | 348/571 |
| 2006/0133476 A1 * | 6/2006 | Page et al. | 375/240.01 |
| 2006/0158968 A1 * | 7/2006 | Vanman et al. | 369/27.01 |
| 2008/0129844 A1 * | 6/2008 | Cusack et al. | 348/241 |
| 2008/0170801 A1 * | 7/2008 | Kozlov et al. | 382/275 |
| 2008/0298639 A1 * | 12/2008 | Tsunekawa et al. | 382/107 |
| 2009/0225200 A1 * | 9/2009 | Ohki | 348/241 |
| 2010/0149334 A1 * | 6/2010 | Wirsz | 348/143 |
| 2012/0056978 A1 * | 3/2012 | Abe et al. | 348/36 |

OTHER PUBLICATIONS

Faisal Bashir and Fatih Porikli; Collaborative Tracking of Objects in EPTZ Cameras; Mitsubishi Electric Research Laboratories, Cambridge, MA, USA; 2007; 10 pages.

Patent Cooperation Treaty from the International Searching Authority; The Written Opinion of the Searching Authority from the European Patent Office, the Netherlands; Dated Dec. 21, 2012; for International Application No. PCT/US2012/058912; Filed Oct. 5, 2012; 16 pages.

* cited by examiner

MULTIPLE RESOLUTION CAMERA SYSTEM FOR AUTOMATED LICENSE PLATE RECOGNITION AND EVENT RECORDING

CROSS-REFERENCE TO RELATED APPLICATION

This application claims the priority benefit of U.S. Provisional Patent Application Ser. No. 61/543,598, filed Oct. 5, 2011, which is hereby incorporated herein by reference.

TECHNICAL FIELD

The present invention relates to first-responder vehicle camera systems and in particular relates to ALPR (automatic license plate recognition) camera systems and ICV (in-car view) camera systems.

SUMMARY OF THE INVENTION

Generally described, the present invention relates to an in-car multiple-resolution camera system for first responder vehicles. An example multiple-resolution camera system includes a high-resolution camera imager for capturing images in high resolution and outputting the same in a first high-resolution image output stream. A signal processing module is provided for processing the first high-resolution image output stream and producing (1) a reduced-area high-resolution image output stream containing image information for only a selected portion or portions of the original image and (2) a wide-area low-resolution image output stream. The wide-area low-resolution image output stream can represent the full image, if desired. An event recorder is provided for recording the events imaged by the camera imager using the wide-image low-resolution image output stream. A license plate recognition system is provided for using the reduced-area high-resolution image output stream to capture and process images of vehicle license plates nearby.

Optionally, the signal processing module produces a wide-image low-resolution image output stream by using less than all of the pixel information contained in the first high-resolution image output stream. Optionally, the signal processing module produces a wide-image low-resolution image output stream by using between about 10% and about 50% of the pixel information contained in the first high-resolution image output stream. One preferred manner of doing so accomplishes this by using only every nth pixel in the first high-resolution image output stream, where n is an integer from 2 to 10 (or more). Alternatively, an array of pixels could be summed or averaged to down sample the image.

Optionally, the in-car multiple-resolution camera system can produce two or more reduced-area high-resolution image output streams containing image information for two distinct portions of the original image for feeding to the ALPR to image and process vehicle license plates in different viewing directions. Alternatively, any of the images output can be the full imager size.

Defined another way, the present invention comprises an in-car multiple-resolution camera system for first responder vehicles. The camera system includes a high-resolution, large field-of-view camera imager for capturing images in high resolution in a relatively large field-of-view and outputting the same in a first high-resolution image output stream having pixel information therein. A signal processing module is provided for segmenting the first high-resolution image output stream and producing multiple virtual camera outputs as if there were multiple cameras. The virtual camera outputs preferably have at least two different resolutions and at least two different views. A low-resolution, wide-field virtual camera output is fed to an in-car event recorder. One or more high-resolution, narrow-field virtual camera outputs are fed to a license plate recognition system.

Preferably, the signal processing module segments the first high-resolution image output stream and produces at least three virtual camera outputs as if there were three cameras having at least two different resolutions and at least three different views. Advantageously, the virtual camera outputs can comprise at least three virtual camera outputs, including a pair of ALPR virtual camera outputs and an ICV virtual camera output. The virtual view areas of interest (camera outputs) can be virtually re-pointed to focus on alternate areas of the image without the need to physically move the camera.

In another form, the present invention includes an improvement to a first responder vehicle of the type having an event recorder and a license plate recognition system. The improvement includes an in-car multiple-resolution camera including a high-resolution camera imager for capturing images in high resolution and outputting the same in a first high-resolution image output stream. The improvement also includes the multiple-resolution camera having a signal processing module for processing the first high-resolution image output stream and producing (1) a reduced-area high-resolution image output stream containing image information for only a selected portion or portions of the original image and (2) a full-image low-resolution image output stream. The improvement also includes a first output signal port for outputting the full-image low-resolution image output stream to the event recorder and a second output signal port for outputting the reduced-area high-resolution image output stream to the license plate recognition system.

DETAILED DESCRIPTION OF EXAMPLE EMBODIMENTS

Figure 1:
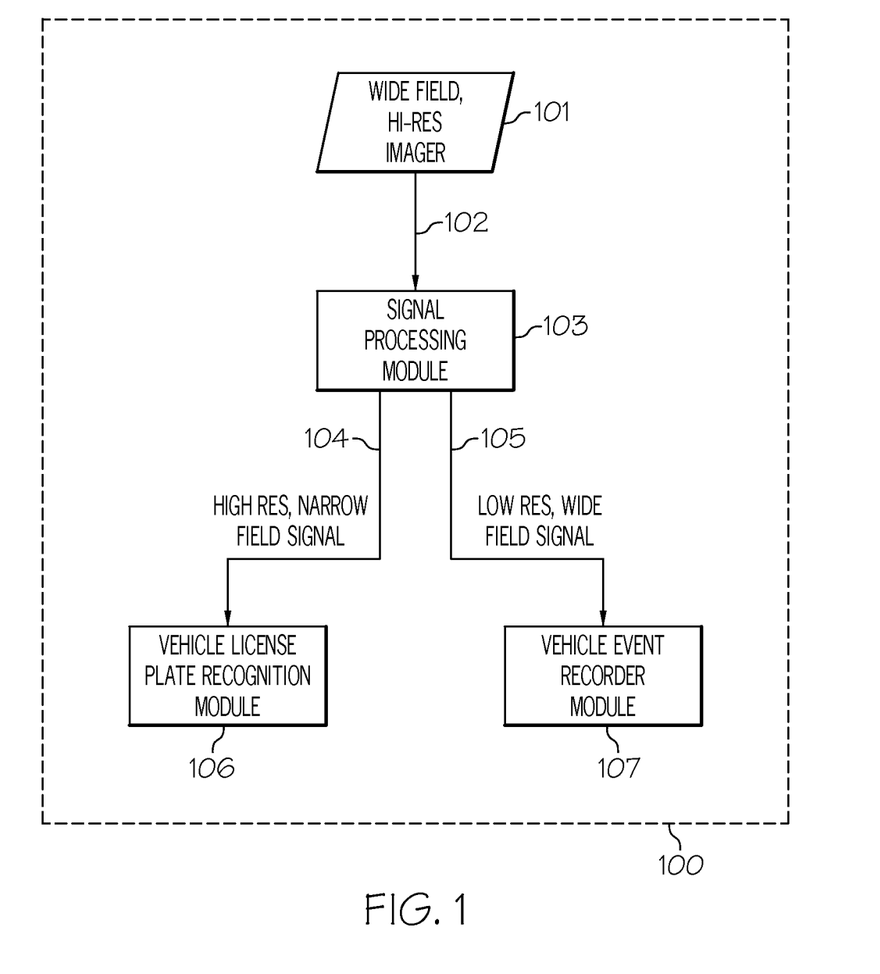
FIG. 1 is a schematic, high-level view of an in-car multiple-resolution camera system for first responder vehicles according to a first example embodiment of the present invention, showing a wide-field high-resolution camera, a signal processing module for segmenting the video into virtual camera views, an ALPR, and an ICV event recorder.

As shown in FIG. 1, the present invention relates to an in-car multiple-resolution camera system 100 for first responder vehicles. An example multiple-resolution camera system 100 includes a wide-field high-resolution camera imager 101 for capturing images in high resolution and outputting the same in a first high-resolution image output stream 102. A signal processing module 103 is provided for processing the first high-resolution image output stream 102 and producing a reduced-area high-resolution image output stream 104 containing image information for only a selected portion of the original image and a wide-area low-resolution image output stream 105. The reduced-area high-resolution image output stream 104 is utilized by an ALPR 106, while the wide-area low-resolution image output stream 105 is utilized by an ICV event recorder 107. Thus, in this example embodiment, the ALPR and/or the ICV can be included as part of the system.

Figure 2:
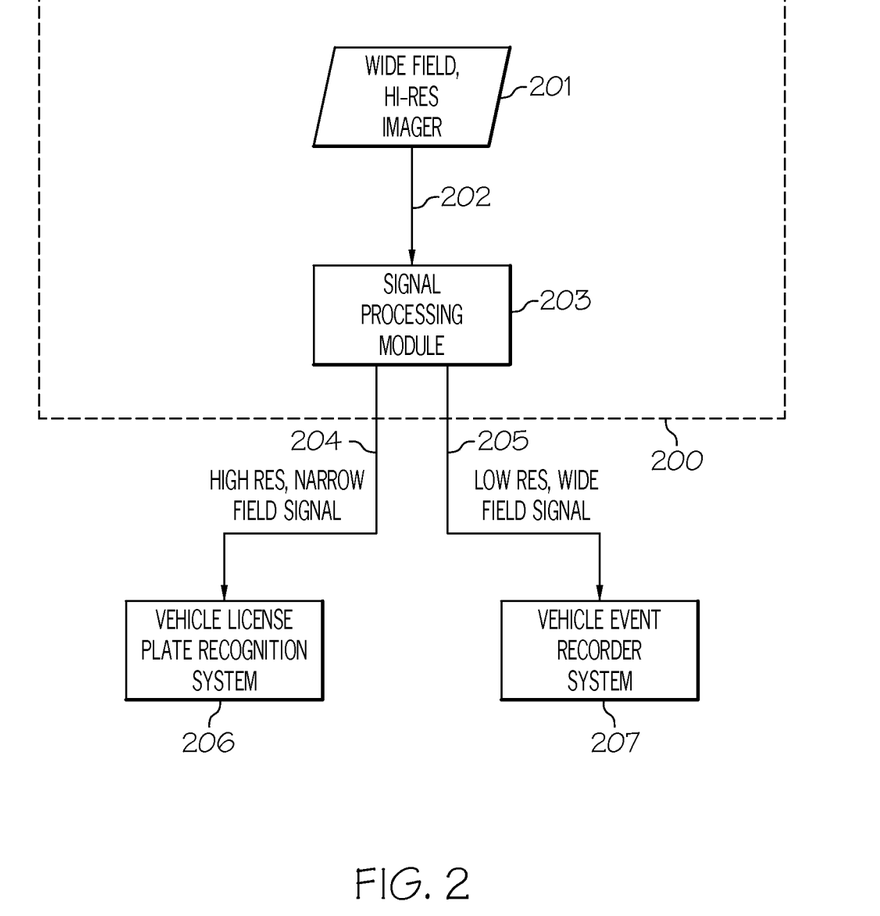
FIG. 2 is a schematic, high-level view of an in-car multiple-resolution camera system for first responder vehicles according to a second example embodiment of the present invention as a retrofit for use with existing ALPR and ICV event recorders, showing a wide-field high-resolution camera and a signal processing module for segmenting the video into two virtual camera views, including a high-resolution narrow view for use by an existing ALPR and a low-resolution, wide-field virtual camera view for use by an existing ICV event recorder.

As shown in FIG. 2, the present invention can be a retrofit to work with existing ALPR and/or ICV event recorder equipment already in place. As shown, an in-car multiple-resolution camera system 200 includes a wide-field high-resolution camera imager 201 for capturing images in high resolution and outputting the same in a first high-resolution image output stream 202. A signal processing module 203 is provided for processing the first high-resolution image output stream 202 and producing a reduced-area high-resolution image output stream 204 containing image information for only a selected portion of the original image and a wide-area low-resolution image output stream 205. The reduced-area high-resolution image output stream 204 is utilized by an ALPR 206, while the wide-area low-resolution image output stream 205 is utilized by an ICV event recorder 207. Thus, as shown in this example embodiment, the ALPR and/or the ICV can be separate from the system 200.

Figure 3:
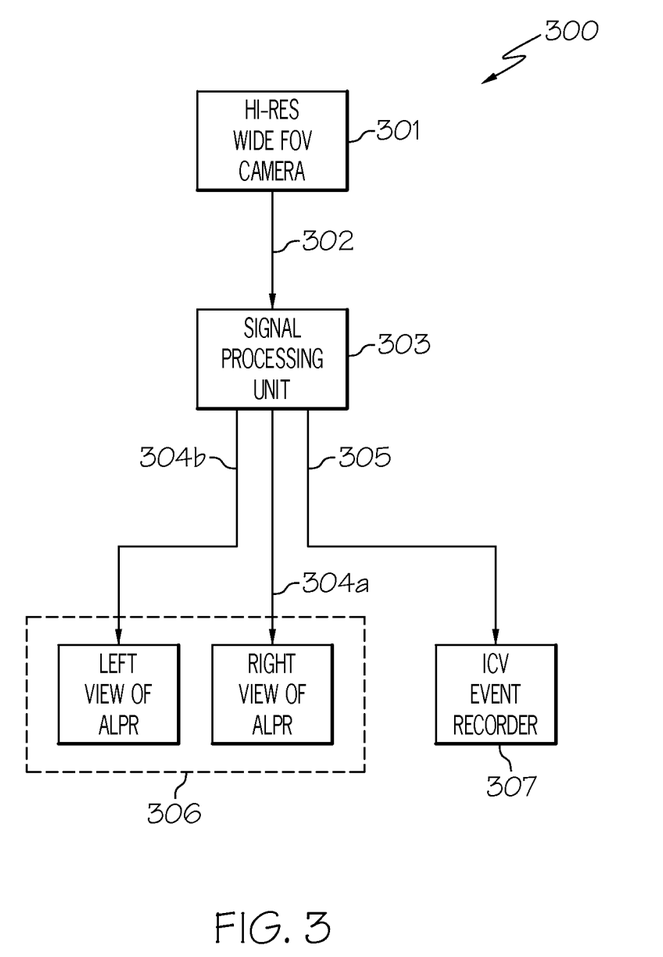
FIG. 3 is a schematic, high-level view of an in-car multiple-resolution camera system for first responder vehicles according to a third example embodiment of the present invention, showing a system architecture for using a wide-field high-resolution camera image and segmenting its output into multiple virtual camera views, including two high-resolution narrow views for use by an ALPR and a third, low-resolution, wide-field virtual camera view for use by an ICV event recorder.

As shown in FIG. 3, an example in-car multiple-resolution camera system 300 for first responder vehicles can provide multiple high-resolution, narrow-FOV virtual views to an ALPR. For example, the system 300 includes a wide-field high-resolution camera imager 301 for capturing images in high resolution and outputting the same in a first high-resolution image output stream 302. A signal processing module 303 is provided for processing the first high-resolution image output stream 302 and producing a pair of reduced-area high-resolution image output streams 304a, 304b. Each of these narrow-FOV virtual views contain image information for only a selected portion of the original image, but in high resolution. The signal processing module 303 also produces a wide-area low-resolution image output stream 305. The reduced-area high-resolution image output streams 304a, 304b are utilized by an ALPR 306, while the wide-area low-resolution image output stream 305 is utilized by an ICV event recorder 307. Thus, in this example embodiment, the ALPR and/or the ICV can be included as part of the system. Alternatively, as described in connection with FIG. 2, the ALPR and the ICV can be separate units and the system can be configured as a retrofit.

An event recorder can be provided for recording the events imaged by the camera imager using the full-image low-resolution image output stream. A license plate recognition system can be provided for using the reduced-area high-resolution image output stream to capture and process images of vehicle license plates nearby. The invention can take the form of an integrated system incorporating an event recorder and a license plate recognition system. Alternatively, the invention can omit one or both of these components, such as for a retrofit to existing first responder vehicles already having an event recorder and a license plate recognition system. In that event, the retrofit can take the form of a system that includes a high-resolution wide-field camera and a signal processing module that takes the output of the camera and produces two or more virtual camera views for use by the existing event recorder and a license plate recognition system.

In one example embodiment, the high-resolution, wide-field camera can comprise a camera with 720×480 pixels and 46 degrees field of view (FOV)—resulting in a resolution of about 15-16 pixels per degree. Typically, ALPR systems require significantly better resolution with the same 720 pixels "spread over" some only 15 degrees (implying a critical resolution of about 50 pixels per degree—more than 3× that of an ICV camera operating at the typical ICV spec).

Existing camera technology allows for a large imaging array sufficient to provide a very large FOV with high resolution. However, with a resulting resolution that is three times as great as that of High Definition video, neither the processing electronics nor algorithms presently exist to support such a thing for use in ALPR or ICV systems. The present invention neatly marries this otherwise incompatible technology to the ALPR and ICV systems and does so by processing the high-resolution, wide-field image and turning it into multiple virtual camera views. One such virtual camera view is provided in a wide-view field and relatively low resolution suitable for use in the ICV. One or more (preferably two or more) virtual camera views are provided in a narrow field and high-resolution format for use in the ALPR. Thus, one can replace multiple separate camera systems with a single wide-field high-resolution camera system, saving valuable space inside the vehicle. This allows a single camera and processing unit to be used for multiple purposes, freeing up valuable space in the vehicle.

Figure 4:
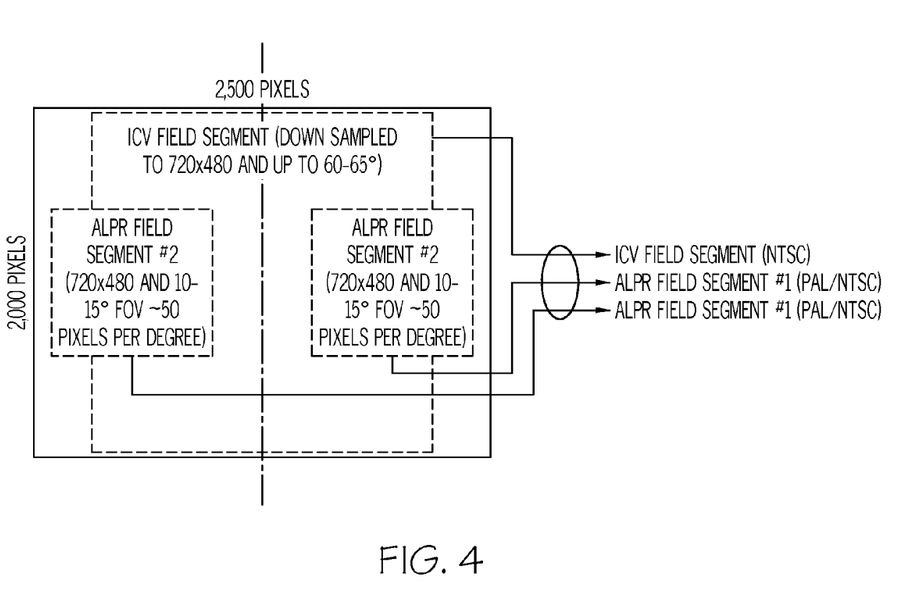
FIG. 4 is a schematic view of an in-car multiple-resolution camera system for first responder vehicles according to a fourth example embodiment of the present invention, showing a wide-field high-resolution camera image segmented into multiple virtual camera views, including two high-resolution narrow views for use by an ALPR and a third, low-resolution, wide-field virtual camera view for use by an ICV event recorder.

In an example embodiment shown in FIG. 4, the camera system 400 leverages a very large pixel array (2,500×2,000—this is more than three times the resolution of HD video) to cover the requisite FOV and virtually segments the pixels into tractable processing fields.

The net result is a single physical camera with a very large FOV (and very high resolution) that is virtually segmented into multiple cameras with divergent resolutions and "directions". From a downstream processing segment (subsequent equipment, such as an ICV event recorder or ALPR unit) it appears to be no different than three cameras. Thus, the subsequent processing load is unchanged. In other words, despite the added raw data being captured by the high-resolution, wide field-of-view camera, the data processing load is similar to the combination of existing ICV and ALPR systems.

Typically, the system includes a Wide Field High Resolution Camera and a Field Segmentation Unit (signal processing unit or module) for segmenting the wide-FOV high-resolution image stream into multiple virtual camera views.

Regarding the Wide Field High Resolution Camera, there are several commercially available cameras that could be adapted or adopted for such use.

Figure 5:
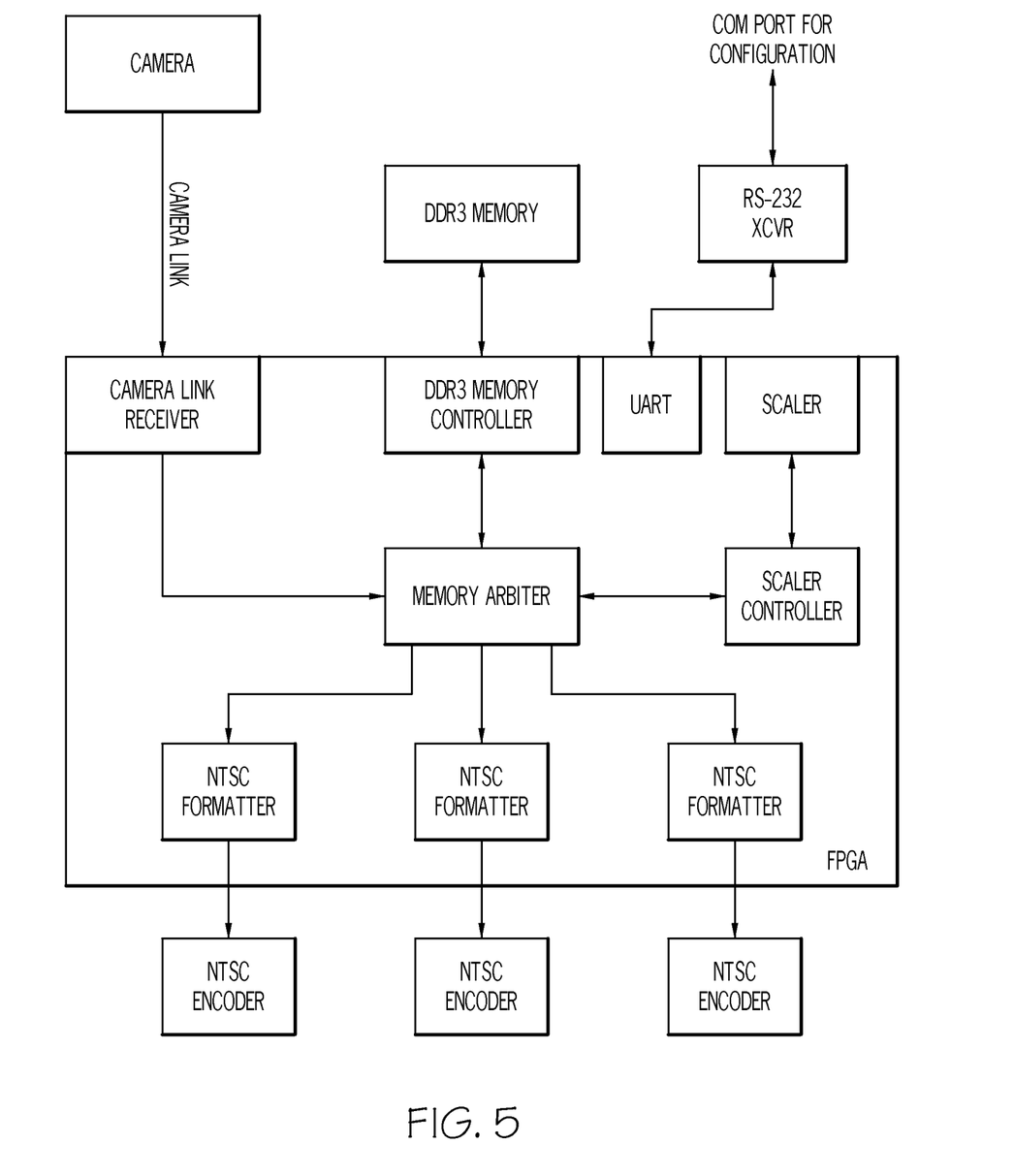
FIG. 5 is a schematic view of an in-car multiple-resolution camera system for first responder vehicles according to FIG. 4, showing a system architecture for using a wide-field high-resolution camera image and segmenting its output into multiple virtual camera views, including two high-resolution narrow views for use by an ALPR and a third, low-resolution, wide-field virtual camera view for use by an ICV event recorder.

Regarding the Field Segmentation Unit, this is a custom unit. An example of such is shown schematically in FIG. 5. This unit parses the high-resolution, wide-FOV output stream into manageable streams based on the ultimate mission of that particular sector (camera element). The specific pixel counts represented can be varied based on the resolution of the camera selected.

Optionally, in one example implementation the ALPR segmentation could be restricted to physical positioning on the expected ALPR fields of interest (perhaps selected via touch screen on the display). In another example embodiment, the ALPR segmentation could utilize intelligent field segmentation in which the system can automatically detect the presence of a license plate and forward the high-resolution pixel array accordingly to the ALPR engine. This would be "pulling" the plate-finding tasks from the ALPR system into the signal processing unit. In this way, an array of plates processed through the solution might actually require less processing as it is more targeted.

Optionally, the system can employ advanced recognition data extraction. An intelligent extraction engine could be used to find license plates, recognize the color of the vehicles and identify the state of the plate, etc. Thus, vehicle information that is useful in investigations could be extracted using the signal processing module.

Optionally, the output of the system can be NTSC/PAL so as to allow for seamless integration into the existing ALPR system and ICV event recorder system. It is also possible to construct a system according the present teachings and utilize the digital form (replacing the downstream encoders) and eventually potentially performing all of the ALPR functions within "the box"—only passing a text string to the MDC for hot list compare and user display. Existing systems are analog, using NTSC and PAL formats and the design could be configured to accommodate the older technology for easy upgrades. Future systems can be digital, removing the need for a digital encoder, streamlining the system and confining all processing elements to a single hardware unit. (vs an encoder and a processing unit)

Optionally, one could employ a more or less a standard camera interface (e.g., a so-called Camera Link) so that one might easily swap cameras.

Advantageously, the present invention allows for the use of a single camera for two or more missions (such as In-Car Video and ALPR). Also, the system provides a wider FOV for the ALPR system, which means less re-pointing of the camera and the ability to actually use the system for two functions concurrently (rather than having to reset the camera). Moreover, the cost of the single high-resolution, wide-FOV camera is less than the cost of multiple cameras/encoders, etc.

It is to be understood that this invention is not limited to the specific devices, methods, conditions, or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the claimed invention has been shown and described in example forms, it will be apparent to those skilled in the art that many modifications, additions, and deletions can be made therein without departing from the spirit and scope of the invention as defined by the following claims.

What is claimed is:

1. An in-car multiple-resolution camera system for first responder vehicles, comprising:
   a single high-resolution camera imager for capturing images in high resolution and outputting the captured images in a first high-resolution image output stream having pixel information therein;
   a signal processing module for processing the first high-resolution image output stream and producing (1) a reduced-area high-resolution image output stream containing image information for only a selected portion or portions of the captured images and (2) a wide-area low-resolution image output stream;
   an event recorder for recording events based on the images captured by the single high-resolution camera imager using the wide-image low-resolution image output stream; and
   a license plate recognition system for capturing and processing images of vehicle license plates nearby based on the images captured by the single high-resolution camera imager using the reduced-area high-resolution image output stream.

2. The in-car multiple-resolution camera system for first responder vehicles as claimed in claim 1 wherein the signal processing module produces a wide-image low-resolution image output stream by using less than all of the pixel information contained in the first high-resolution image output stream.

3. The in-car multiple-resolution camera system for first responder vehicles as claimed in claim 2 wherein the signal processing module produces a wide-image low-resolution image output stream by using only every nth pixel in the first high-resolution image output stream, where n is an integer from 2 to 10.

4. The in-car multiple-resolution camera system for first responder vehicles as claimed in claim 1 wherein the signal processing module produces a wide-image low-resolution image output stream by using between about 10% and about 50% of the pixel information contained in the first high-resolution image output stream.

5. The in-car multiple-resolution camera system for first responder vehicles as claimed in claim 1 wherein the signal processing module for processing the first high-resolution image output stream produces two or more reduced-area high-resolution image output streams containing image information for two distinct portions of the captured image.

6. The in-car multiple-resolution camera system for first responder vehicles as claimed in claim 1 wherein the signal processing module processes the first high-resolusion image output stream from the single high-resolution camera imager and produces two or more reduced-area high-resolution image output streams containing image information for two distinct portions of the captured images, with one of the two distinct portions of the captured images being used for automatic license plate recognition for on-coming vehicles approaching the first responder vehicle on one side of the first responder vehicle and the other of the two distinct portions of the captured image being used for automatic license plate recognition for other vehicles approaching the first responder vehicle on the other side of the first responder vehicle.

7. An in-car multiple-resolution camera system for first responder vehicles, comprising:
- a single high-resolution, large-FOV camera imager for capturing images of an area in high resolution in a relatively large field-of-view and outputting the captured images in a first high-resolution image output stream having pixel information therein;
- a signal processing module for segmenting the first high-resolution image output stream and producing multiple virtual camera outputs as if there were multiple cameras, the outputs having at least two different resolutions and representing at least two different views of the area.

8. The in-car multiple-resolution camera system for first responder vehicles as claimed in claim 7 wherein the signal processing module segments the first high-resolution image output stream and produces at least three virtual camera outputs as if there were three cameras having at least two different resolutions and at least three different views.

9. The in-car multiple-resolution camera system for first responder vehicles as claimed in claim 8 wherein the at least three virtual camera outputs comprise a pair of automatic license plate recognition virtual camera outputs and an in-car view virtual camera output.

10. The in-car multiple-resolution camera system for first responder vehicles as claimed in claim 7 further comprising an event recorder for recording events based on the images captured by the single high-resolution, large-FOV camera imager using one of the virtual camera outputs and a license plate recognition system for capturing and processing images of vehicle license plates nearby using another of the virtual camera outputs.

11. In a first responder vehicle of the type having an event recorder and a license plate recognition system, the improvement therein comprising:
- an in-car multiple-resolution camera including a high-resolution camera imager for capturing images in high resolution and outputting the captured maqes in a first high-resolution image output stream;
- the in-car multiple-resolution camera including a signal processing module for processing the first high-resolution image output stream and producing (1) a reduced-area high-resolution image output stream containing image information for only a selected portion or portions of the captured images and (2) a full-image low-resolution image output stream;
- a first output signal port for outputting the substantially full-image low-resolution image output stream to the event recorder; and
- a second output signal port for outputting the reduced-area high-resolution image output stream to the license plate recognition system.

* * * * *